United States Patent
Kopmels et al.

(10) Patent No.: US 7,442,008 B2
(45) Date of Patent: Oct. 28, 2008

(54) COOLED GAS TURBINE AEROFOIL

(75) Inventors: Michiel Kopmels, Bristol (GB); Ian Tibbott, Litchfield (GB); Edwin Dane, Nottingham (GB); Timothy M Mitchell, Bristol (GB)

(73) Assignee: Rolls-Royce plc, London (GB)

( * ) Notice: Subject to any disclaimer, the term of this patent is extended or adjusted under 35 U.S.C. 154(b) by 514 days.

(21) Appl. No.: 11/207,892

(22) Filed: Aug. 22, 2005

(65) Prior Publication Data
US 2007/0253815 A1 Nov. 1, 2007

(30) Foreign Application Priority Data
Aug. 25, 2004 (GB) .................. 0418903.1
Aug. 25, 2004 (GB) .................. 0418905.6
Aug. 25, 2004 (GB) .................. 0418906.4

(51) Int. Cl.
*F01D 5/18* (2006.01)

(52) U.S. Cl. ............. 416/97 R; 416/191; 416/192

(58) Field of Classification Search ......... 415/115–116; 416/92, 96 R, 96 A, 97 R, 190–192
See application file for complete search history.

(56) References Cited

U.S. PATENT DOCUMENTS

| | | | | |
|---|---|---|---|---|
| 4,224,011 A | * | 9/1980 | Dodd et al. | 416/97 R |
| 4,818,178 A | | 4/1989 | Sibbertsen | |
| 4,940,388 A | * | 7/1990 | Lilleker et al. | 416/97 R |
| 5,813,835 A | * | 9/1998 | Corsmeier et al. | 416/97 R |
| 6,491,496 B2 | * | 12/2002 | Starkweather | 416/97 R |

FOREIGN PATENT DOCUMENTS

| | | |
|---|---|---|
| EP | 1 319 803 A3 | 6/2003 |
| EP | 1 327 747 A2 | 7/2003 |
| GB | 1188401 | 4/1970 |
| GB | 2 322 167 A | 8/1998 |
| JP | 58-202303 A * | 11/1983 |
| JP | 60-135606 A * | 7/1985 |
| JP | A 60-198305 | 10/1985 |
| JP | A 08-246802 | 9/1996 |
| JP | A 08-260901 | 10/1996 |

* cited by examiner

*Primary Examiner*—Christopher Verdier
(74) *Attorney, Agent, or Firm*—Oliff & Berridge, plc

(57) ABSTRACT

An internal fluid cooling system for a gas turbine aerofoil comprises a plurality of multi-pass cooling arrangements each of which consists of a serpentine passage in the interior of the aerofoil. The cooling fluid—in particular air—is supplied to an inlet end of each passage and exhausted through a multiplicity of discharge holes to provide tip, leading edge, trailing edge and surface film cooling. The inlet end of a first serpentine passage is positioned close to the leading edge and flows rearwards while the inlet end of the second serpentine passage is positioned close to the trailing edge and flows forwards. These serpentine passages are disposed side-by-side, one adjacent the pressure surface and the other adjacent the suction surface on opposite sides of a main load carrying member which comprises a major part of the internal structure of the aerofoil.

10 Claims, 3 Drawing Sheets

Section on B-B

Section on B-B in Fig. 4

Section on C-C in Fig. 4

Section on A-A in Fig. 1

COOLED GAS TURBINE AEROFOIL

BACKGROUND

This invention relates to the cooling of aerofoils in a gas turbine engine.

The performance of the simple gas turbine engine cycle, whether measured in terms of efficiency or specific output is improved by increasing the turbine gas temperature. It is therefore desirable to operate the turbine at the highest possible temperature. For any engine cycle compression ratio or bypass ratio, increasing the turbine entry gas temperature will always produce more specific thrust (eg engine thrust per unit of air mass flow). However as turbine entry temperatures increase, the life of an uncooled turbine falls, necessitating the development of better materials and the introduction of internal air cooling.

In modern engines, the high pressure (HP) turbine gas temperatures are now much hotter than the melting point of the blades' materials used and in some engine designs the intermediate pressure (IP) and low pressure (LP) turbines are also cooled. During its passage through the turbine the mean temperature of the gas stream decreases as power is extracted. Therefore the need to cool the static and rotary parts of the engine structure decreases as the gas moves from the HP stage(s) through the IP and LP stages towards the exit nozzle.

Internal convection and external films are the prime methods of cooling the aerofoils. HP turbine nozzle guide vanes (NGVs) consume the greatest amount of cooling air on high temperature engines. HP blades typically use about half of the NGV flow. The IP and LP stages downstream of the HP turbine use progressively less cooling air.

Blades and vanes are cooled by using high pressure (HP) air from the compressor that has by-passed the combustor and therefore is relatively cool compared to the temperature of the working gas in the gas path. Typical cooling air temperatures are between 700 and 900 K. Gas path temperatures can be in excess of 2100 K. The cooling air extracted from the compressor and used to cool hot turbine components is not used fully to extract work from the turbine. Extracting coolant flow therefore has an adverse effect on the engine operating efficiency and it is thus important to use this cooling air as effectively as possible.

Historically, in a simple internal air cooling system the cooling air has been passed through an aerofoil in the radial direction from blade root to tip, often with provision for effusion cooling of the leading and trailing edges. The efficiency of such systems is limited because high cooling efficiency is obtained with a passage having a high length to diameter ratio. Other factors have to be considered, the minimum passage "diameter" is limited, for example by the manufacturing process utilised and by aerofoil weight, and the length is dictated by the size of the component. More recently improved casting technology has enabled the use of a multi-pass cooling arrangement, where the flow is passed up and down the component a number of times and has resulted in higher efficiencies than those obtained by a simple radial system.

One characteristic, although not the sole one, affecting the performance of an internal cooling system is the amount of heat absorbed by the coolant. The rate at which the coolant absorbs heat is dependent on the temperature difference between the surrounding metal surface and the coolant. Consequently systems tend to function less well towards the end of a multi-pass arrangement, and the temperature of the metal surrounding the cooling passage changes from relatively cold near the inlet to relatively hot near the exit. The resulting temperature gradients are undesirable but to some extent unavoidable.

Prior art attempts to mitigate the effects of the above-mentioned characteristic feature of internal air cooling systems have employed a plurality of multi-pass cooling arrangements. Examples of such arrangements are described in earlier published patents numbers in order of publication date: GB 1,188,401 of 1970; U.S. Pat. No. 4,818,178 of 1987; JP8246802 and JP 8260901 both of 1996; GB 2,322,167 of 1998; EP 1,327,747 of 2003 and EP 1,319,803 of 2004. In all of these documented prior arrangements the internal air-cooling systems illustrated comprise multi-pass cooling arrangements arranged in tandem, that is in the chordal direction of the blade one of the cooling arrangements is positioned towards the leading edge and a second behind it towards the trailing edge. JP 60198305 published in 1985 also shows an internal air-cooling system employing a plurality of multi-pass cooling arrangements comprising a tandem pair adjacent the pressure surface of the blade and another tandem pair adjacent the suction surface of the blade. It is common ground to all of these arrangements that the inlet ends of the multi-pass serpentine passages to which cooling air is supplied are located adjacent one another and towards a point midway between the leading and trailing edges. Thus, the cooling arrangements absorb heat most efficiently towards the centre of the blade where the cooling air has most heat capacity and operate less efficiently adjacent the leading and trailing edges where some of the heat capacity of the air has already been taken up. As a result the cooling arrangements tend to exaggerate a temperature gradient within the metal of the blade by preferentially cooling the centre of the blade while at the same time allowing the temperature of the leading and trailing edges to increase.

SUMMARY

According to the present invention a cooled gas turbine aerofoil having an aerofoil profiled section defined by a suction surface and a pressure surface supported by an internal structure, including an internal fluid cooling system comprising a plurality of multi-pass cooling arrangements, each of which consists of a serpentine passage one end of which, in operation, receives cooling fluid from an external fluid source, wherein cooling fluid is supplied to a first serpentine passage towards the leading edge of the aerofoil section and to a second serpentine passage towards the trailing edge of the aerofoil section is characterised in that the first and second serpentine passages are disposed side-by-side, on opposite sides of a main load carrying member in the internal structure of the aerofoil, one adjacent the suction surface of the aerofoil and the other adjacent the pressure surface of the aerofoil.

Preferably the cooled gas turbine aerofoil is further characterised in that the first serpentine passage is disposed on the pressure surface side of the internal structure of the aerofoil and receives cooling fluid at its end towards the leading edge of the aerofoil section and the second serpentine passage is disposed on the suction surface of the internal structure of the aerofoil and receives cooling fluid at its end towards the trailing edge of the aerofoil section.

BRIEF DESCRIPTION OF THE DRAWINGS

The invention and how it may be carried into practice will now be described by way of example with reference to the accompanying drawings, in which.

DETAILED DESCRIPTION OF EMBODIMENTS

The present invention is related to subject matter described in UK patent applications GB 0418905.6 and GB 0418906.4. The embodiments referred to by way of example to illustrate the invention concern gas turbine propulsion engines but it is not intended that the invention should be construed as restricted to use as aircraft propulsion units, nor is it intended to restrict the coolant used to cooling air extracted from the engine itself. Although the following example described below is a blade comprising part of a rotary assembly the invention may be implemented for cooling a guide vane, that is part of a non-rotary annulus.

Figure 1:
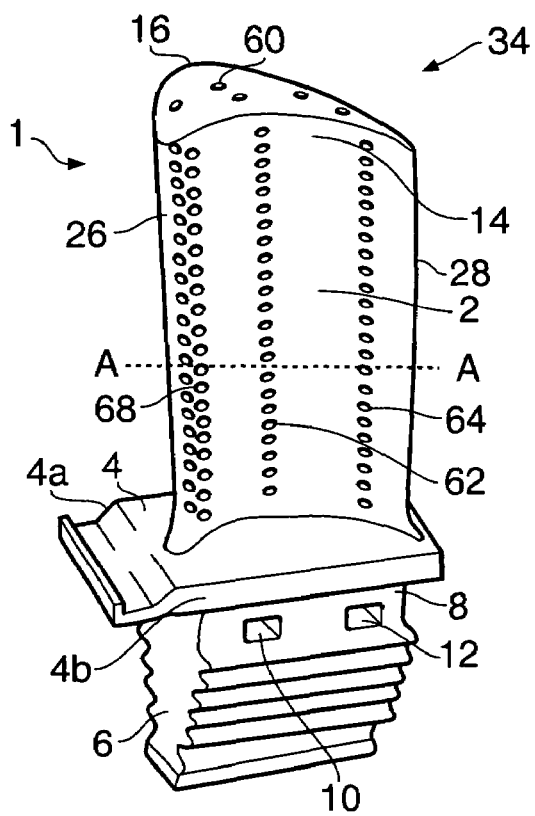
FIG. 1 shows a perspective view of a turbine blade having a double, multi-pass internal air-cooling arrangement.
Figure 2:
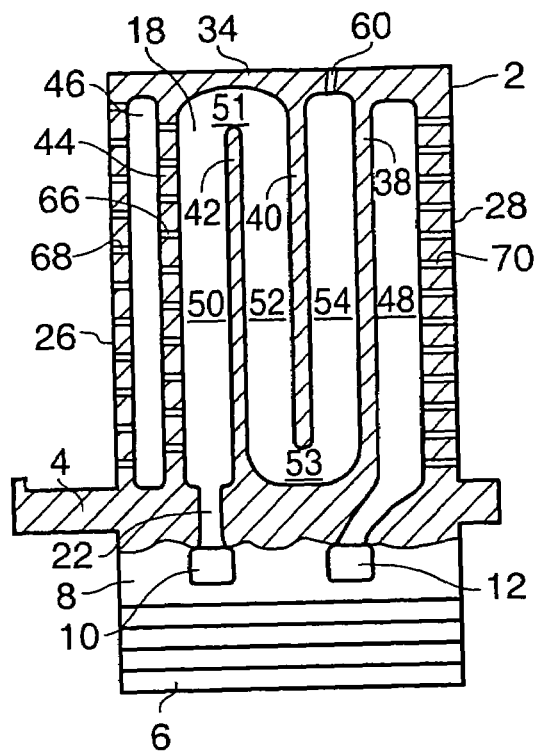
FIG. 2 shows in side view a cross-section on B-B in FIG. 4 of a radial plane through one of the two multi-pass cooling arrangement of the turbine blade of FIG. 1.
Figure 3:
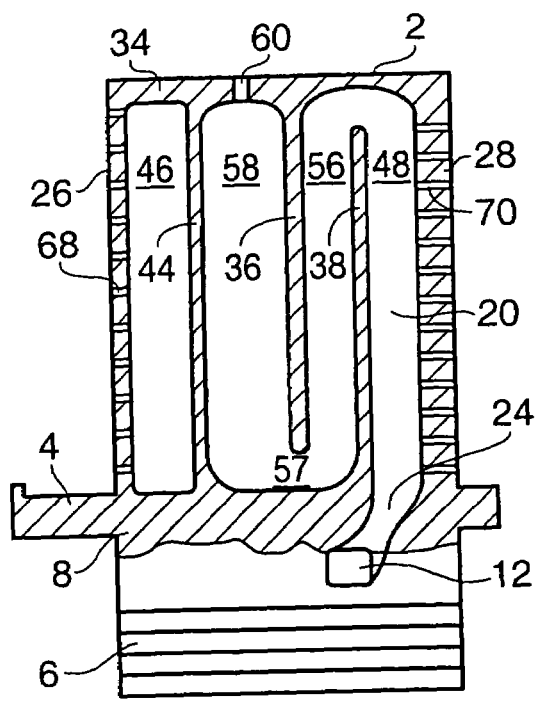
FIG. 3 shows in side view a cross-section on C-C in FIG. 4 of a radial plane through the other of the two multi-pass cooling arrangement of the turbine blade of FIG. 1.
Figure 4:
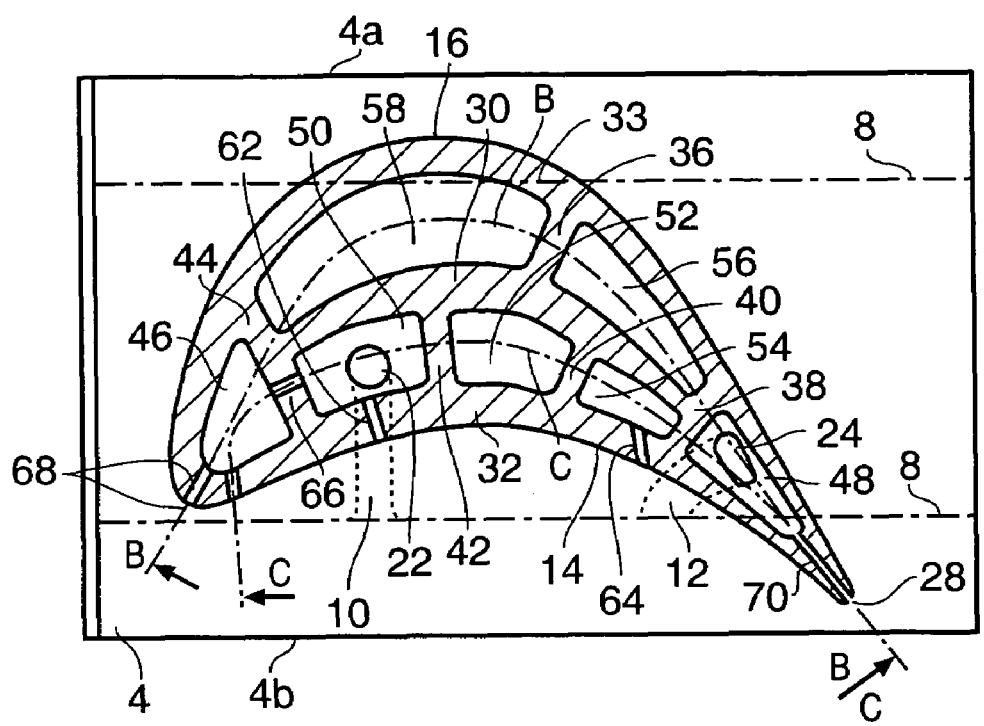
FIG. 4 shows a cross-section view on A-A in FIG. 1 through the interior of an aerofoil section at mid-height on a plane perpendicular to a radius illustrating the arrangement of internal air-cooling passages of the turbine blade of FIGS. 1,2 and 3.

Referring now to the drawings, in FIG. 1 there is shown a general arrangement of a typical gas turbine blade having an internal air cooling system comprising a plurality of multi-pass internal air-cooling arrangements details of which are shown in FIGS. 2, 3 and 4. A turbine rotor assembly comprises a multiplicity of such blades spaced apart equidistantly around the circumference of a disc and mounted thereon by means of a root carried by a blade engaged with a corresponding slot formed in the disc rim. The disc and other engine components are not shown in the drawings.

In FIG. 1 the blade 1 illustrated consists of an internally air-cooled aerofoil section 2 upstanding from a platform 4, the lateral dimensions of the platform in the circumferential direction are chosen so that in an assembled rotor the side edges 4a, 4b of adjacent platforms 4 abut and effectively form a continuous annular platform. As is normal practice there may be a small gap between each pair of adjacent platform edges which is sealed to prevent hot gas escaping the gas path, for example by a strip seal (not shown). The aerofoil section 2 and platform 4 of each blade are carried by a fir-tree root section 6, adapted for mounting the blade 1 in the rim of a disc (not shown), spaced from the underside of the platform 4 by a shank 8. Other blade root forms may be employed and it is not intended that the invention should be restricted to a particular root configuration. Also the invention may be implemented in blades which form part of a BLISK ie a rotor in which the blades are formed integrally with or permanently attached to the circumference of a disk, in which case the blade would be carried on a foot rather than a root of the kind configured for mechanical engagement.

Typically the space immediately in front of the disc is adapted and arranged to form a cooling air plenum from which cooling air is drawn across the front face of the disc into the internal air cooling systems of the blades through inlet apertures 10, 12 in the shank 8. In an alternative configuration cooling air inlet apertures may be formed in the base, or underside, of the root 6.

In the interior of the aerofoil section 2 the internal air-cooling system comprises a plurality of multi-pass cooling arrangements. In the embodiment illustrated in detail in FIGS. 2, 3 and 4 the turbine blade has two such multi-pass cooling arrangements 18, 20. A first multi-pass cooling arrangement, generally indicated at 18 and shown in detail in FIG. 2, is situated towards the pressure surface 14 of the blade 1. A second multi-pass cooling arrangement, generally indicated at 20 and shown in detail in FIG. 3, is situated towards the suction surface 16 of the blade 1. FIGS. 2 and 3 are views taken on a radial plane through the blade 1 to show the general layout of each of the serpentine passages 18, 20 respectively. FIG. 4 is a view through the aerofoil profiled section 2 at right angles to the views of FIGS. 2 and 3 and better shows the relationship between the passages 18, 20 and the internal structure of the section.

The serpentine passages 18, 20 have upstream ends 22, 24 respectively connected to receive, in operation, cooling air from a source thereof. In the embodiment being described that source is the plenum against the face of the rotor disc, which ultimately receives cooling air from the high-pressure compressor section of the engine. The end 22 of passage 18 connects with a first inlet aperture 10 (see FIG. 2) and the end 24 of passage 20 connects with a second inlet aperture 12 (see FIG. 3). Coolant from the plenum source enters the upstream end of each passage and travels along its length. It may be discharged through one of a multiplicity of exit apertures distributed along the length of the passage which pierce the wall of the profiled section 2 or through the radially outer tip in accordance with the overall blade cooling strategy.

The aerofoil profiled section 2 comprises an outer wall 32 having a blade profile pressure side surface 14 on one side and a blade profile suction side surface 16 on the other side. The surfaces 14, 16 meet at an aerofoil section leading edge 26 in the upstream direction and at an aerofoil section trailing edge 28 in the downstream direction. Internally on the profiled section 2 according to the present invention, and as illustrated in FIG. 4, these serpentine passages 18, 20 are disposed on opposite sides of a main load carrying member 30 which comprises a major part of the internal structure of the blade.

The internal construction of the aerofoil profiled section 2 and the disposition of the individual multi-pass sections of cooling passages 18, 20 may be appreciated more easily by reference to FIG. 4. The structure of aerofoil 2 comprises a first outer wall 32 that extends from leading edge 26 to trailing edge 28 on one side forming the pressure surface 14 and a second outer wall 33 on the other side forming the suction surface 16. The outer wall 32 is supported by an internal structure comprising the main load carrying member 30 which extends from the root 6 and shank 8 to the blade tip region 34. The member 30 is attached on both sides to the outer walls 32 and 33 by interior walls 36, 38, 40, 42 and 44 and together these define the serpentine passages 18, 20 and other chambers. The main load carrying member is bounded in the direction of leading edge 26 by internal wall 44 and in the direction of trailing edge 28 by internal wall 38. The wall 44 extends between the pressure and suction surfaces side walls 32, 33 across one end of the main member 30 towards the leading edge 26, thus forming a leading edge chamber 46. Similarly towards trailing edge 28 the interior wall 38 extends across the end of member 30 between the pressure and suction surfaces side walls 32, 33 forming a trailing edge chamber 48.

On the pressure surface 14 side of central member 30, interior walls 38, 40, 42, 44 divide the internal space into interconnected passages 50, 52 and 54 and these comprise sections of a first serpentine passage 18. The inlet aperture 10 communicates through the passage 22 with an ascending passage 50 (with reference to the plane of FIG. 2) which in turn leads into a descending passage section 52 via a U-bend 51 through internal wall 42 at its end towards the blade tip region. At the bottom of passage 52 a further U-bend 53 leads into passage 54 which extends in a generally radial direction towards the tip region of blade 1. At the blade tip the passage 54 may exhaust through exit holes 60 into a blade tip region. If required by the blade cooling design further air exit holes 62 and 64 (FIG. 1) from passages 52, 54 respectively may be provided in the pressure surface 14.

On the suction surface 16 side of central member 30 interior walls 36, 38, 44 divide the internal space into interconnected chambers 56, 58 and these together with the trailing edge chamber 48 comprise sections of the second serpentine passage 20. The inlet 12 and upstream passage end 24 lead into chamber 48, which constitutes the first leg of the multi-pass passage 20. In turn the chamber 48 leads via a U-bend 55 through wall 38 into a descending passage section 56. At the bottom of passage 56 a further U-bend 57 through the foot of wall 36 leads into passage 58 which extends the height of the leading edge. Passage 58 is separated by internal wall 44 from the leading edge passage 46. Cooling fluid may exhaust from passage 58 through further ones of the exit holes 60 in the blade tip region. Further surface cooling holes (not shown) may also be provided in the aerofoil suction surface 32 through holes (not shown) in the outer wall 33 of the aerofoil profile section 2.

The gas turbine blade may be provided with an internal fluid cooling system comprising at least one forward flowing multi-pass cooling arrangement and at least one rearward flowing multi-pass cooling arrangement. The turbine blade illustrated in FIGS. 1 to 4 is provided with an internal air-cooling system comprising a forward flowing and a rearward flowing multi-pass cooling arrangement.

The upstream passageway 50 of first multi-pass cooling arrangement 18 is adapted and arranged to cool the leading edge 26 of the aerofoil profiled section 2. In FIG. 2 the chamber 46 immediately behind the leading edge 26 receives cooling fluid from the cooling passage 50 through a series of impingement cooling holes 66 which pierce the internal wall 44. A further series of effusion or surface film cooling holes 68 are formed through the aerofoil wall 32, 33 at or close to the leading edge 26 through which coolant is supplied to a surface cooling film over the external surface of the profiled section 2. In accordance with normal practice these impingement holes 66 are not aligned with the exit holes 68 so that the internal jets of cooling air impinge on the inner surface of the leading edge 26 between the exit holes 68.

The trailing edge of the profiled section is cooled by fluid exhausted from the second multi-pass cooling arrangement 20. The outer wall of section 2 is pierced at the aerofoil trailing edge 28 by a multiplicity of effusion cooling holes 70 which open directly into the interior of the first passage 48 of the second serpentine passage 20.

Figure 5:
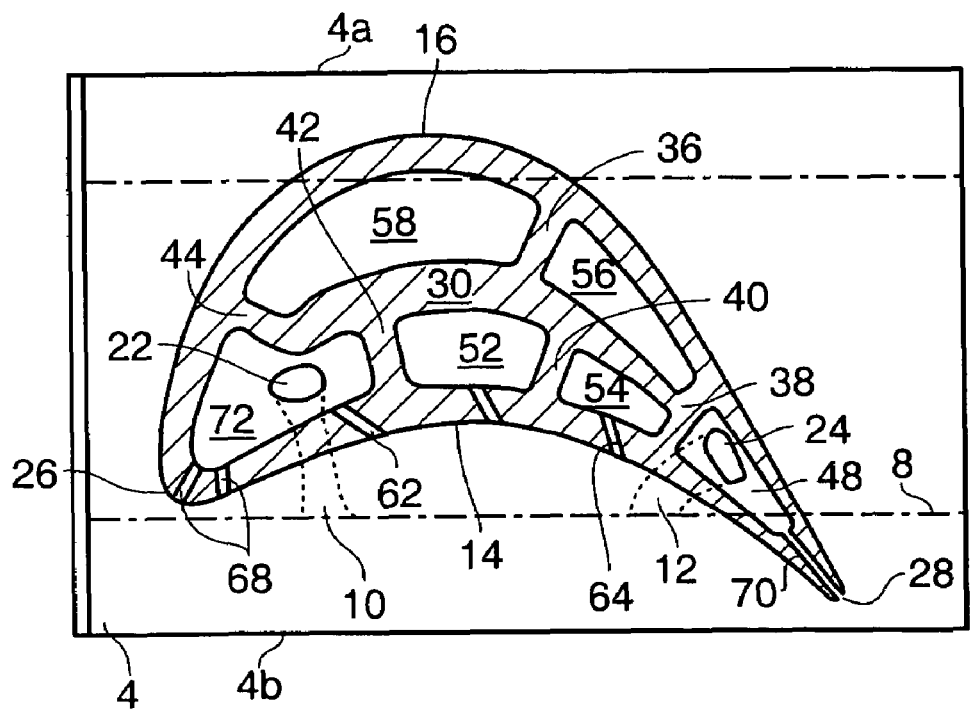
FIG. 5 shows a similar view of an alternative arrangement of internal air-cooling passages in a second embodiment of the turbine blade of FIG. 1.

The aerofoil profile section of FIG. 5 illustrates a variation of the internal cooling arrangements as compared to the arrangement of FIGS. 2 to 4; like parts carry like references. The difference in variation of the embodiment of FIG. 5 resides mainly towards the leading edge. Essentially a portion of the internal dividing wall 44 forming the separate leading edge impingement cooling chamber 46 is omitted so that, instead of the chamber 46 and a separate passage 50 comprising the first part of the serpentine passage 18, there is a larger cross-section passage 72 communicating directly with the inlet aperture 10 and the leading edge effusion cooling holes 68. That is there is no impingement cooling of the internal surface of the leading edge 26.

As previously mentioned the cooling air in multi-pass cooling arrangements absorbs heat in its progress along the passage and therefore becomes progressively less efficient at cooling. By arranging for opposite flows in the arrangements on either side of central wall 40 the invention overcomes this drawback by the juxtaposition of the cooler end of one flow opposite the hotter end of the other flow. Thus the flows in each of the passages automatically compensate for the decrease in cooling efficiency in the other. As a result the central wall 40 has a more uniform temperature than would have been the case if the multi-pass cooling flows had been arranged end-to-end or had been flowing in the same direction. Similarly the inner and outer walls of the aerofoil obtain a more uniform temperature and results in increased aerofoil life. Moreover, the juxtaposition of the inlet ends of the cooling passages close to the leading and trailing edges of the blades results in the cooling fluid being supplied to those regions when its cooling efficiency is highest, at least during its residence time within a blade interior. This is in contrast to prior arrangements in which cooling air is introduced to the cooling passages towards a mid-chord position so that it has absorbed a significant amount of heat before reaching the leading and trailing edges.

Multiple multi-pass cooling systems arranged in this way have been found to be particularly suitable for aerofoils having greater thickness/chord ratios than hitherto. Potentially a multi-pass cooling system has a higher cooling efficiency as result of its high length/diameter ratio. The use of two such systems effectively increases the length/diameter ratio.

Also the use of cooler cooling air in the leading edge and trailing edge regions where the multi-pass cooling systems flow towards each other is beneficial to the operational characteristics of the leading and trailing edges. The operating temperature of the metal alloy in those regions is reduced for a given set of gas conditions and results in increased useful blade life.

In addition a benefit is obtained from a cold, or at least cooler, central dividing wall leading to an increase of blade creep life and reduced coolant requirement.

Figure 6:
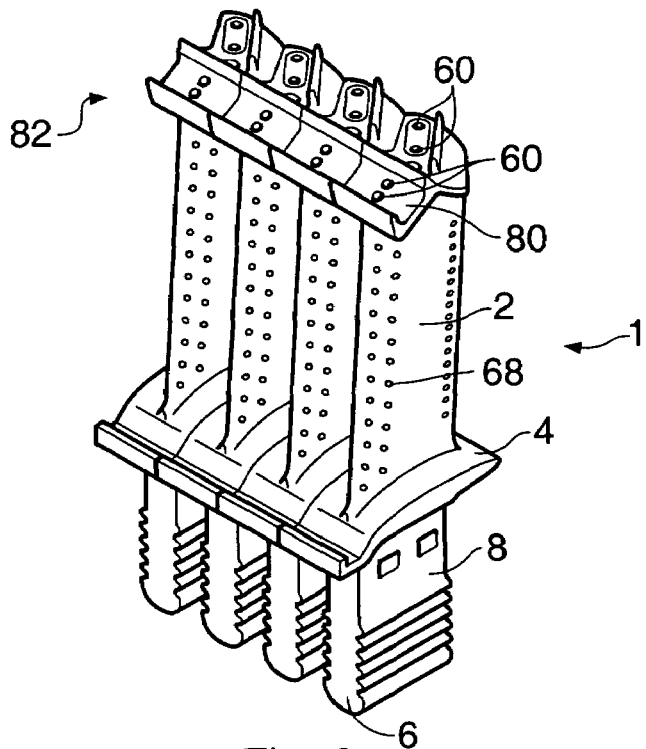
FIG. 6 shows a perspective view of a segment of a shrouded turbine annulus employing turbine blades according to the invention.

The blade illustrated in FIG. 1 is of the shroudless type. Another embodiment of the shrouded type is illustrated in FIG. 6. Each blade 1 has an aerofoil profiled section 2 provided with a tip shroud section 80 carried at its radially outer blade tip. The shroud sections 80 extend in circumferential directions, in the same manner as the platforms 4, so that neighbouring shroud sections abut at their adjacent edges to form a substantially continuous shroud annulus, generally indicated at 82. In such an assembly the cooling air exit holes 60 open into the shroud tip region to supply cooling air to the shroud and the turbine casing (not shown) encircling the turbine stage. The cooling air exit holes 60 are in communication with at least one multi-pass cooling arrangement.

In order to carry the extra weight of the shroud sections 80 the main load carrying member 30 extends into, and preferably is formed integrally with, said shroud sections. Thus the loads generated by the mass of a shroud section 80 are transmitted directly to the main load carrying member 30 on that blade. At a given operating temperature the load carrying capacity is directly related to creep resistance of the metal, and the hotter the metal the less load it is capable of carrying and the shorter is its life. Consequently a reduction in the temperature of the metal yields immediate benefit as an improvement in the load carrying capacity of said member.

Providing the operating temperature of the metal is maintained at a reduced level the life of the whole component is increased.

Although the invention has been described by way of example with reference to a turbine blade it will be appreciated that the invention may be utilised in other embodiments. For example, the invention may be applied to a turbine vane to provide internal cooling in which case, in the absence of a blade root and shank, the position and configuration of the cooling air entry apertures is adapted accordingly.

The invention claimed is:

1. A cooled gas turbine aerofoil comprising:
    an aerofoil profiled section defined by a suction surface and a pressure surface both supported by an internal structure, the aerofoil profiled section having a leading edge, containing a plurality of leading edge exit holes, and a trailing edge, containing a plurality of trailing edge exit holes; and
    an internal fluid cooling system comprising a plurality of multi-pass cooling arrangements, each of which includes a serpentine passage which, in operation, receives a cooling fluid from an external fluid source, wherein:
    a first serpentine passage receives the cooling fluid through a first inlet towards the leading edge of the aerofoil profiled section, and supplies the cooling fluid to the plurality of leading edge exit holes before the cooling fluid flows through the first serpentine passage in a general direction that is away from the leading edge of the aerofoil profiled section;
    a second serpentine passage receives the cooling fluid through a second inlet; and
    the first and the second serpentine passages are disposed side-by-side, on opposite sides of a main load carrying member in the internal structure of the aerofoil, one adjacent the suction surface of the aerofoil and the other adjacent the pressure surface of the aerofoil.

2. The gas turbine aerofoil of claim 1, wherein:
    the first serpentine passage is disposed on the pressure surface side of the main load carrying member and the second serpentine passage is disposed on the suction surface side of the main load carrying member.

3. The gas turbine aerofoil of claim 1, wherein:
    the plurality of multi-pass fluid cooling arrangements comprises at least one forward flowing multi-pass cooling arrangement and at least one rearward flowing multi-pass cooling arrangement.

4. The gas turbine aerofoil of claim 3, wherein:
    the forward flowing multi-pass cooling arrangement exhibits a general direction of fluid flow from the trailing edge to the leading edge; and
    the rearward flowing multi-pass cooling arrangement exhibits a general direction of fluid flow from the leading edge to the trailing edge.

5. The gas turbine aerofoil of claim 3 further comprising a leading edge fluid cooling chamber behind the leading edge of the aerofoil which is supplied by the rearwards flowing multi-pass fluid cooling arrangement.

6. The gas turbine aerofoil of claim 3 further comprising a trailing edge fluid cooling chamber ahead of the trailing edge of the aerofoil which is supplied by the forwards flowing multi-pass fluid cooling arrangement.

7. The gas turbine aerofoil of claim 1 for use in a shrouded turbine stage wherein:
    the aerofoil profiled section carries a circumferentially extending tip shroud section; and
    the main load carrying member is formed integrally with the circumferentially extending tip shroud section.

8. The gas turbine aerofoil of claim 7, wherein:
    the circumferentially extending tip shroud section has a plurality of cooling flow exit holes in communication with at least one multi-pass cooling arrangement.

9. The gas turbine aerofoil of claim 1, wherein the second serpentine passage receives the cooling fluid towards the trailing edge of the aerofoil profiled section and supplies the cooling fluid to the plurality of trailing edge exit holes.

10. The gas turbine aerofoil of claim 9, wherein the second serpentine passage supplies the cooling fluid to the plurality of trailing edge exit holes before the cooling fluid flows through the second serpentine passage in a general direction that is away from the trailing edge of the aerofoil profiled section.

* * * * *

UNITED STATES PATENT AND TRADEMARK OFFICE
CERTIFICATE OF CORRECTION

PATENT NO.         : 7,442,008 B2                                    Page 1 of 1
APPLICATION NO. : 11/207892
DATED              : October 28, 2008
INVENTOR(S)        : Michiel Kopmels et al.

It is certified that error appears in the above-identified patent and that said Letters Patent is hereby corrected as shown below:

<u>Title page,</u>
Replace Item [75], to read as follows:
--[75] Inventors: Michiel Kopmels, Bristol (GB); Ian Tibbott, Litchfield (GB); Edwin Dane, Nottingham (GB); Mark T. Mitchell, Bristol (GB)--

Signed and Sealed this

Twentieth Day of January, 2009

JON W. DUDAS
*Director of the United States Patent and Trademark Office*